United States Patent [19]

Shadoian

[11] Patent Number: 5,460,058

[45] Date of Patent: Oct. 24, 1995

[54] APPARATUS AND METHOD FOR INSPECTING AN AIR BAG MODULE

[75] Inventor: Andrew D. Shadoian, Birmingham, Mich.

[73] Assignee: TRW Vehicle Safety Systems Inc., Lyndhurst, Ohio

[21] Appl. No.: 204,737

[22] Filed: Mar. 2, 1994

[51] Int. Cl.⁶ .................................................. G01M 19/00
[52] U.S. Cl. .................................... 73/865.8; 33/552
[58] Field of Search ............................... 73/865.8, 865.9; 33/551, 552, 554, DIG. 5

[56] References Cited

U.S. PATENT DOCUMENTS

| | | |
|---|---|---|
| 3,597,981 | 8/1971 | Wakabayashi . |
| 4,221,053 | 9/1980 | Bobel, II et al. ........................ 33/552 |
| 4,591,149 | 6/1986 | Long ........................................ 33/552 |
| 4,803,871 | 2/1989 | Harada et al. . |
| 4,858,479 | 8/1989 | Voss et al. . |
| 4,862,596 | 9/1989 | Iino et al. ................................ 33/552 |
| 4,976,025 | 12/1990 | Aldridge, Jr. et al. . |
| 5,086,569 | 2/1992 | Possati et al. ........................... 33/551 |

Primary Examiner—Hezron E. Williams
Assistant Examiner—Nashimiya Ashraf
Attorney, Agent, or Firm—Tarolli, Sundheim & Covell

[57] ABSTRACT

An apparatus (10) and method are provided for inspecting an air bag module (12) having a deployment door (15). The apparatus (10) includes a plurality of sensors (55), a base structure (52), and a pneumatic motor (56). The base structure (52) supports the air bag module (12). The pneumatic motor (56) moves the base structure (52) relative to the sensors (55), and thus moves the base structure (52) to and from an inspection station. The sensors (55) sense a characteristic of the air bag module (12) when the sensors (55) are actuated. A controller (62) actuates the sensors (55) when the air bag module (12) is supported at the inspection station by the base structure (52). The controller (62) provides an electrical signal in response to the sensing by the sensors (55). The electrical signal provided by the controller (62) indicates the characteristic of the air bag module (12) that is sensed by the sensors (55).

16 Claims, 7 Drawing Sheets

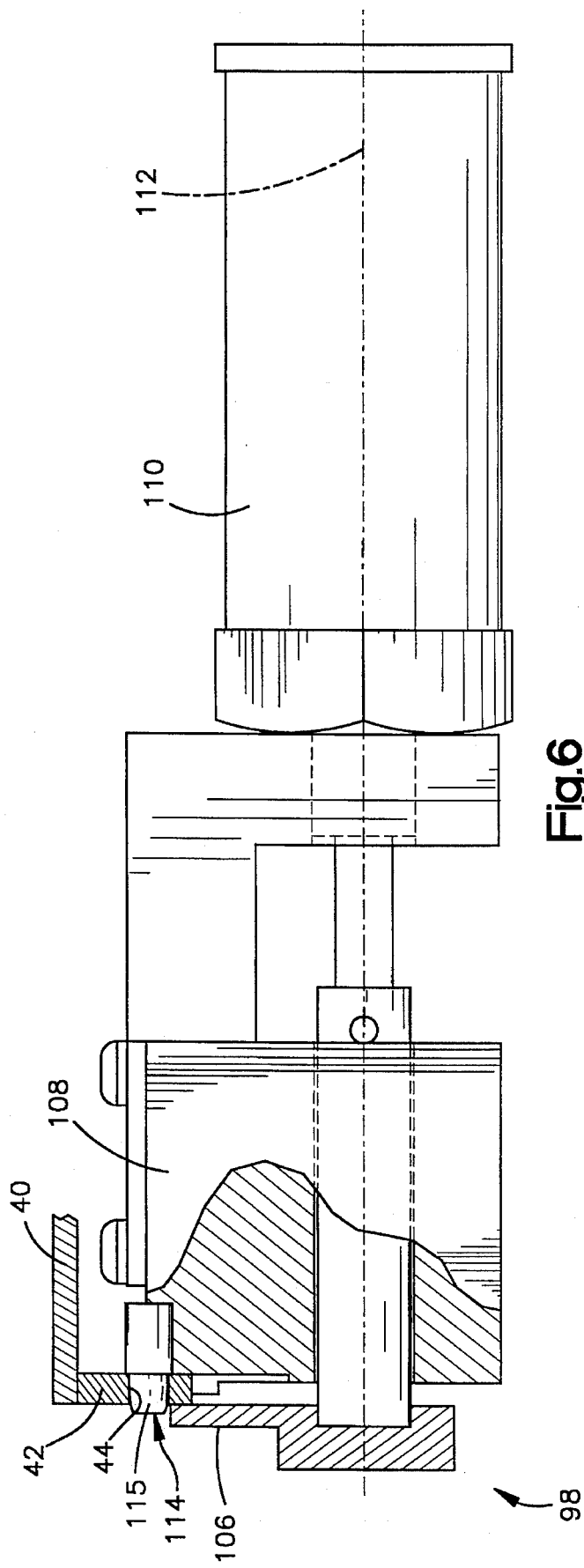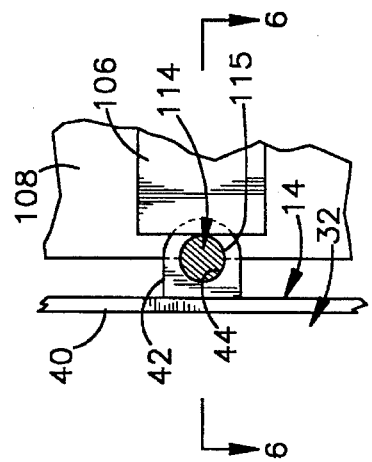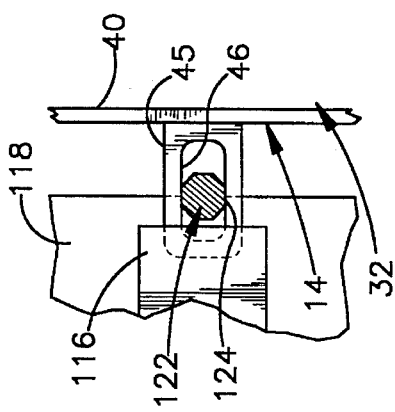

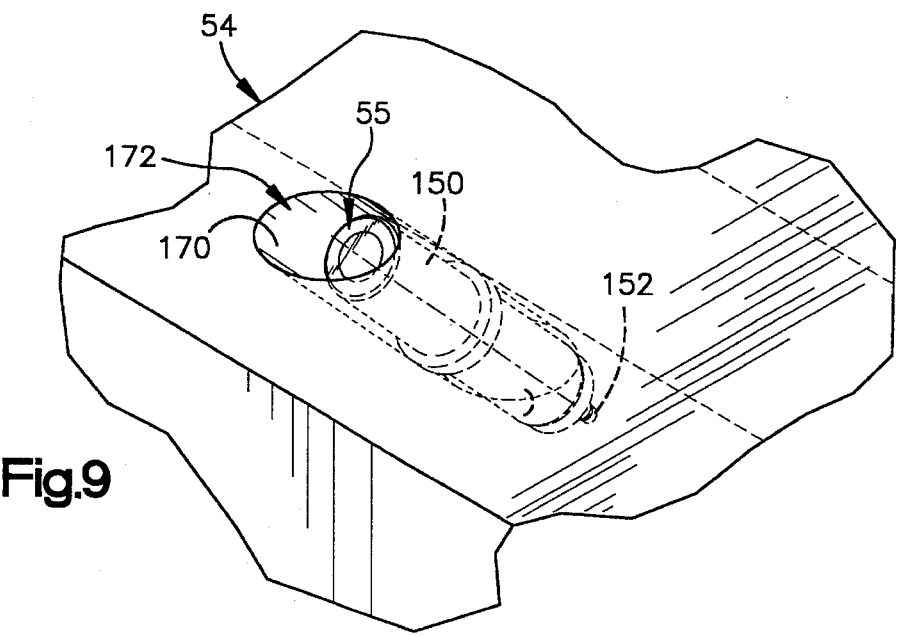
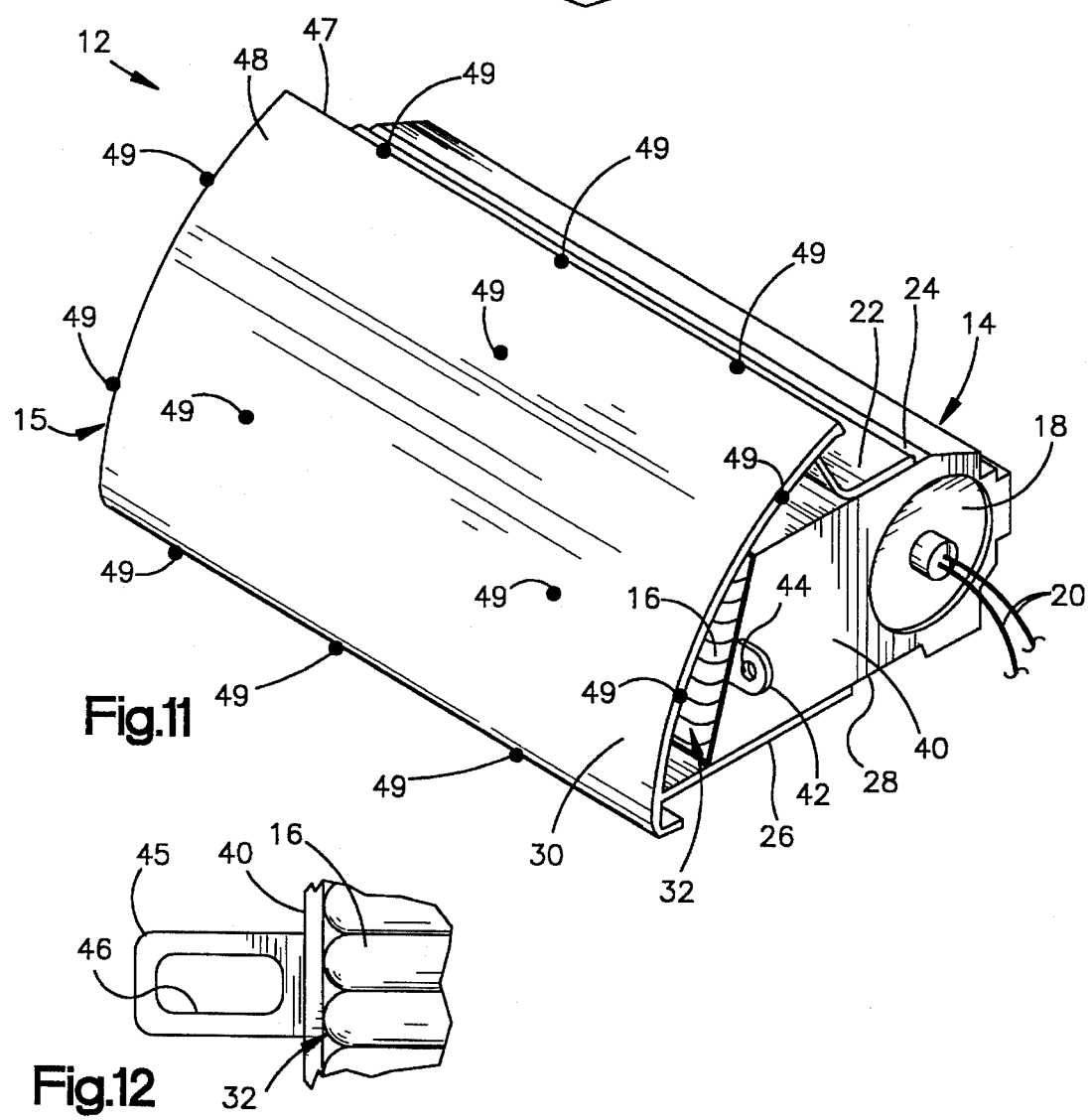

APPARATUS AND METHOD FOR INSPECTING AN AIR BAG MODULE

FIELD OF THE INVENTION

The present invention relates to an apparatus and method for inspecting an air bag module.

BACKGROUND OF THE INVENTION

An inflatable vehicle occupant restraint, such as an air bag, is inflated upon the occurrence of a vehicle collision. Inflation fluid is directed to flow from a source of inflation fluid into the air bag to inflate the air bag. The inflation fluid expands the air bag from a stored condition to an inflated condition in which the air bag extends into the vehicle occupant compartment. When the air bag is inflated into the occupant compartment, it restrains an occupant of the vehicle from forcefully striking parts of the vehicle.

The air bag is concealed from the occupant compartment when it is stored in the vehicle. A deployment door typically extends over the stored air bag to conceal it from the occupant compartment. The inflating air bag is directed against the deployment door to open and move the deployment door out of the path of the air bag when the air bag is inflated and moved into the occupant compartment.

The air bag is stored in an air bag module which is mounted in the vehicle. The module includes the source of inflation fluid, and also includes the deployment door. When the module is mounted in the vehicle, the deployment door fits closely with the structure of the vehicle in which the module is mounted. For example, a particular type of air bag module is mounted in the instrument panel of the vehicle. Such an air bag module is received in an opening in the instrument panel. The deployment door extends across the opening in the instrument panel to conceal the air bag and the other parts of the module from the occupant compartment. The deployment door thus fits closely with the instrument panel so as to have the appearance of a continuous part of the instrument panel. Therefore, the air bag module, and particularly the deployment door, is designed and assembled with reference to the instrument panel in which it is to be mounted.

In the prior art, such an air bag module is inspected manually to determine if it will fit as intended with the particular instrument panel for which it is designed. The module is clamped on an inspecting stand by manually turning a plurality of screw threaded clamps which engage the module on the inspecting stand. When the module is thus clamped on the inspecting stand, it is oriented such that a plurality of predetermined gauge points on the deployment door have nominal positions relative to the inspecting stand. The nominal positions of the gauge points on the deployment door are predetermined with reference to the particular instrument panel for which the module is designed. A hand-held measuring tool is used to measure the displacements of the gauge points from their nominal positions on the inspecting stand. The measured displacements are recorded manually, and the fit of the module is then determined in view of the recorded displacement data.

The prior art inspecting method, including clamping the air bag module on the inspecting stand, measuring and recording the displacements of the gauge points from their nominal positions, and subsequently unclamping the module for removal from the inspecting stand, is time consuming and can cause a substantial delay in the production of the module.

SUMMARY OF THE INVENTION

In accordance with the present invention, an apparatus and method are provided for inspecting an air bag module. The apparatus comprises a sensor means, a base means, and a motor means. The base means supports the module. The motor means moves the base means relative to the sensor means, and thus moves the base means to and from an inspection station. The sensor means senses a characteristic of the module when the sensor means is actuated.

The apparatus further comprises a controller means for actuating the sensor means when the module is supported at the inspection station by the base means. The controller means provides an electrical signal in response to the sensing by the sensor means. The electrical signal indicates the characteristic of the module that is sensed by the sensor means.

In a preferred embodiment of the present invention, the characteristic of the air bag module that is sensed by the sensor means, and indicated by the electrical signal, is the degree to which the module will fit as intended with a particular vehicle instrument panel in which it is designed to be mounted. The base means includes a datum means for defining nominal positions for a plurality of predetermined gauge points on a deployment door of the module. The nominal positions of the gauge points on the deployment door are predetermined with reference to the particular instrument panel for which the module is designed. The sensor means includes a plurality of sensors which sense the displacements of the gauge points from their nominal positions. As a result, the electrical signal indicates the fit of the module as a function of the displacements of the gauge points from their nominal positions.

In the preferred embodiment of the present invention, the controller means comprises a controller with a display screen. The motor means moves the base means between the inspection station and a delivery station which is spaced from the inspection station. An operator of the apparatus manually places the module on the base means at the delivery station, and then closes a pair of operating switches to initiate an inspecting operation. The controller responds to the closure of the operating switches by actuating a clamping means which clamps the module on the base means at the delivery station. The controller then directs the motor means to move the base means and the module from the delivery station to the inspection station.

When the base means and the air bag module arrive at the inspection station, the controller actuates the sensors and determines the fit of the module as a function of the displacements that are measured by the sensors. The electrical signal, which indicates the fit of the module with the instrument panel, is provided as a result signal on the display screen so that the operator of the apparatus is automatically provided with the result of the inspecting operation.

The controller subsequentially directs the motor means to return the base means and the module from the inspection station to the delivery station, and further directs the clamping means to release the module for manual removal from the base means at the delivery station by the operator of the apparatus. An inspecting operation is thus performed quickly and automatically with a high degree of accuracy that is consistently repeatable for a plurality of air bag modules.

BRIEF DESCRIPTION OF THE DRAWINGS

The foregoing and other features of the present invention will become apparent to those skilled in the art to which the present invention relates from reading the following description of a preferred embodiment of the present invention with reference to the accompanying drawings, in which:

FIG. 5 is an enlarged partial view showing parts of the apparatus of FIG. 1, and also showing parts of an air bag module;

FIG. 6 is a view taken on line 6—6 of FIG. 5;

FIG. 7 is a view similar to FIG. 5 showing other parts of the apparatus and other parts of the air bag module;

FIG. 9 is an enlarged partial view of parts shown in FIG. 8;

FIG. 11 is a perspective view of the air bag module shown partially in FIGS. 5 and 7; and FIG. 12 is an enlarged partial view of parts of the air bag module of FIG. 11.

DESCRIPTION OF A PREFERRED EMBODIMENT

Figure 1:
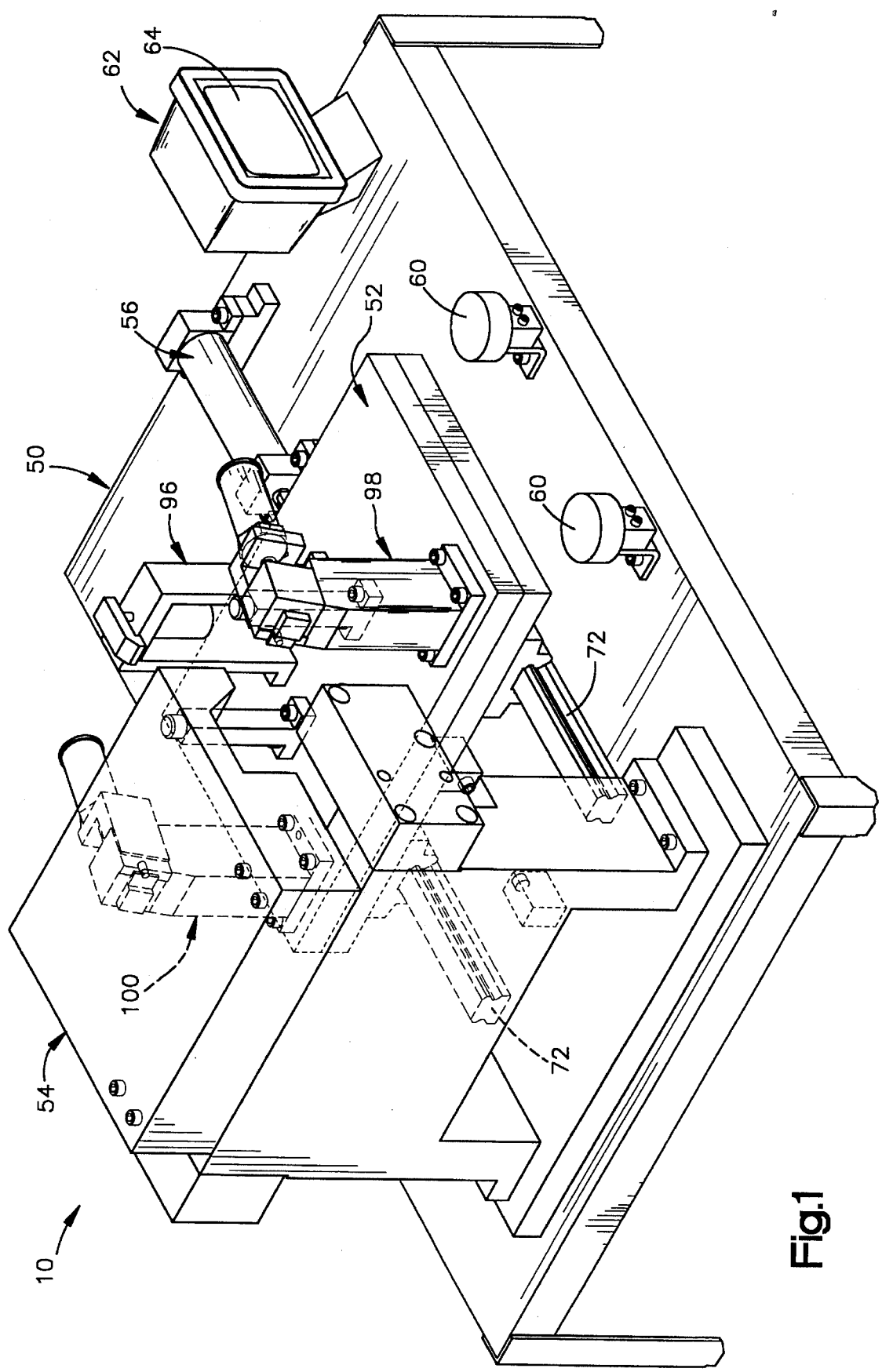
FIG. 1 is a perspective view of an apparatus comprising a preferred embodiment of the present invention.

An inspecting apparatus 10 comprising a preferred embodiment of the present invention is shown in FIGS. 1–10. The inspecting apparatus 10 is designed and operated to inspect a particular type of inflatable vehicle occupant restraint device, namely, an air bag module.

The Air Bag Module

As an example of air bag modules that can be inspected in accordance with the present invention, an air bag module 12 is shown in FIGS. 11 and 12. The air bag module 12 includes a reaction canister 14 and a deployment door 15. The reaction canister 14 contains an inflatable air bag 16 and an inflator 18. The inflator 18 comprises a source of inflation fluid, and thus contains an ignitable gas generating material and/or a quantity of stored inflation fluid, as known in the art. The inflator 18 is actuated upon the passage of electric current between a pair of lead wires 20 extending into the inflator 18.

The deployment door 15 has an upper portion 22 mounted on a top surface 24 of the reaction canister 14, and has a lower portion 26 mounted on a bottom surface 28 of the reaction canister 14. A panel portion 30 of the deployment door 15 extends between the upper portion 22 and the lower portion 26. The panel portion 30 of the deployment door 15 thus extends over a deployment opening 32 in the reaction canister 14.

When the inflator 18 is actuated, it provides inflation fluid which is directed into the air bag 16. As the inflation fluid begins to inflate the air bag 16, it moves the air bag 16 outward through the deployment opening 32 in the reaction canister 14 and forcefully against the panel portion 30 of the deployment door 15. A stress riser extending across either the panel portion 30 or the lower portion 26 of the deployment door 15 ruptures under the stress induced by the pressure of the inflation fluid in the air bag 16. The panel portion 30 of the deployment door 15 is thus released to pivot, either as a single piece or in two pieces (upper and lower), out of the path of movement of the air bag 16 as the air bag 16 inflates and emerges from the reaction canister 14.

In the exemplary air bag module 12, the reaction canister 14 has a generally rectangular shape with a pair of opposite end walls 40, one of which is shown in FIG. 11. The end wall 40 that is shown in FIG. 11 supports a first mounting tab 42 which projects from the end wall 40. An annular inner edge surface 44 of the first mounting tab 42 defines a circular opening which receives a fastener (not shown) for mounting the module 12 in the instrument panel of a vehicle. The end wall 40 at the opposite end of the reaction canister 14 is shown partially in FIG. 12. That end wall 40 supports a second mounting tab 45 with an inner edge surface 46 defining an elongated, slot-shaped opening. The opening in the second mounting tab 45 similarly receives a fastener (not shown) for mounting the module 12 in the instrument panel of the vehicle.

When the module 12 is mounted in the instrument panel of the vehicle, the deployment opening 32 faces toward the vehicle occupant compartment through an opening in the instrument panel. The panel portion 30 of the deployment door 15 extends over the opening in the instrument panel to close the opening, and to conceal the air bag 16 and the reaction canister 14 from the occupant compartment. The module 12 thus fits closely with the adjacent surfaces of the particular instrument panel in which it is mounted. The panel portion 30 of the deployment door 15 thus has a peripheral edge surface 47 which is designed to adjoin a surrounding edge surface of the instrument panel. The panel portion 30 of the deployment door 15 further has a front side surface 48 which is designed to continue the trim theme of the vehicle across the opening in the instrument panel. Accordingly, the dimensions and the contour of the deployment door 15, particularly at the peripheral edge surface 47 and the front side surface 48 of the panel portion 30, should be controlled precisely with reference to the instrument panel during manufacture and assembly of the module 12, and should be repeated closely throughout the production of a plurality of modules like the module 12.

In accordance with the present invention, the module 12 is inspected to determine if it will fit as intended with the particular vehicle instrument panel for which it is designed. Specifically, the peripheral edge surface 47 and the front side surface 48 of the deployment door 15 are inspected at a plurality of predetermined gauge points 49. Each of the gauge points 49 has a nominal position in the three dimensional array of gauge points 49 shown in FIG. 11. The nominal position of each gauge point 49 is predetermined with reference to the particular instrument panel with which the module 12 is designed to fit. Therefore, when the module 12 is in the assembled condition shown in FIG. 11, the displacements of the gauge points 49 from their nominal positions indicate the degree to which the module 12 will fit as intended with the particular instrument panel for which it is designed.

In addition to being predetermined with reference to a particular instrument panel, the nominal positions of the gauge points 49 on the deployment door 15 are also predetermined with reference to the reaction canister 14. As a result, the displacements of the gauge points 49 from their nominal positions can be measured at a location remote from the instrument panel by measuring them with reference to the reaction canister 14. Specifically, the nominal positions of the gauge points 49 on the deployment door 15 are predetermined with reference to a primary datum surface, a secondary datum surface, and a tertiary datum surface on the reaction canister 14. The primary datum surface is the bottom surface 28 of the reaction canister 14. The secondary datum surface is the inner edge surface 44 of the first mounting tab 42. The tertiary datum surface is the inner edge surface 46 of the second mounting tab 45. In accordance with the present invention, the displacements of the gauge points 49 on the deployment door 15 are measured with reference to the primary, secondary, and tertiary datum surfaces 28, 44 and 46 on the reaction canister 14. The degree to which the module 12 will fit as intended with the particular instrument panel is determined accordingly.

The Inspecting Apparatus

As shown in FIG. 1, the inspecting apparatus 10 includes a table 50 which supports a movable base structure 52 and a sensor support structure 54. The base structure 52 has parts that engage the air bag module 12 (FIG. 11) to mount the module 12 releasably on the base structure 52. The sensor support structure 54 supports a plurality of sensors 55 (FIG. 8) for inspecting the module 12. A pneumatic motor 56 moves the base structure 52 relative to the sensor support structure 54 when the pneumatic motor 56 is actuated. The pneumatic motor 56 thus moves the base structure 52 back and forth on the table 50 between a delivery station, which is spaced from the sensor support structure 54, and an inspection station, which is adjacent to the sensor support structure 54.

Also supported on the table 50 are a pair of operating switches 60, known as palm buttons, and a controller 62 with a display screen 64. The controller 62 actuates the pneumatic motor 56 and the sensors 55 to conduct an inspecting operation in accordance with the present invention when both of the switches 60 are closed manually by an operator of the inspecting apparatus 10. The controller 62 then displays the results of the inspecting operation on the display screen 64.

Figure 2:
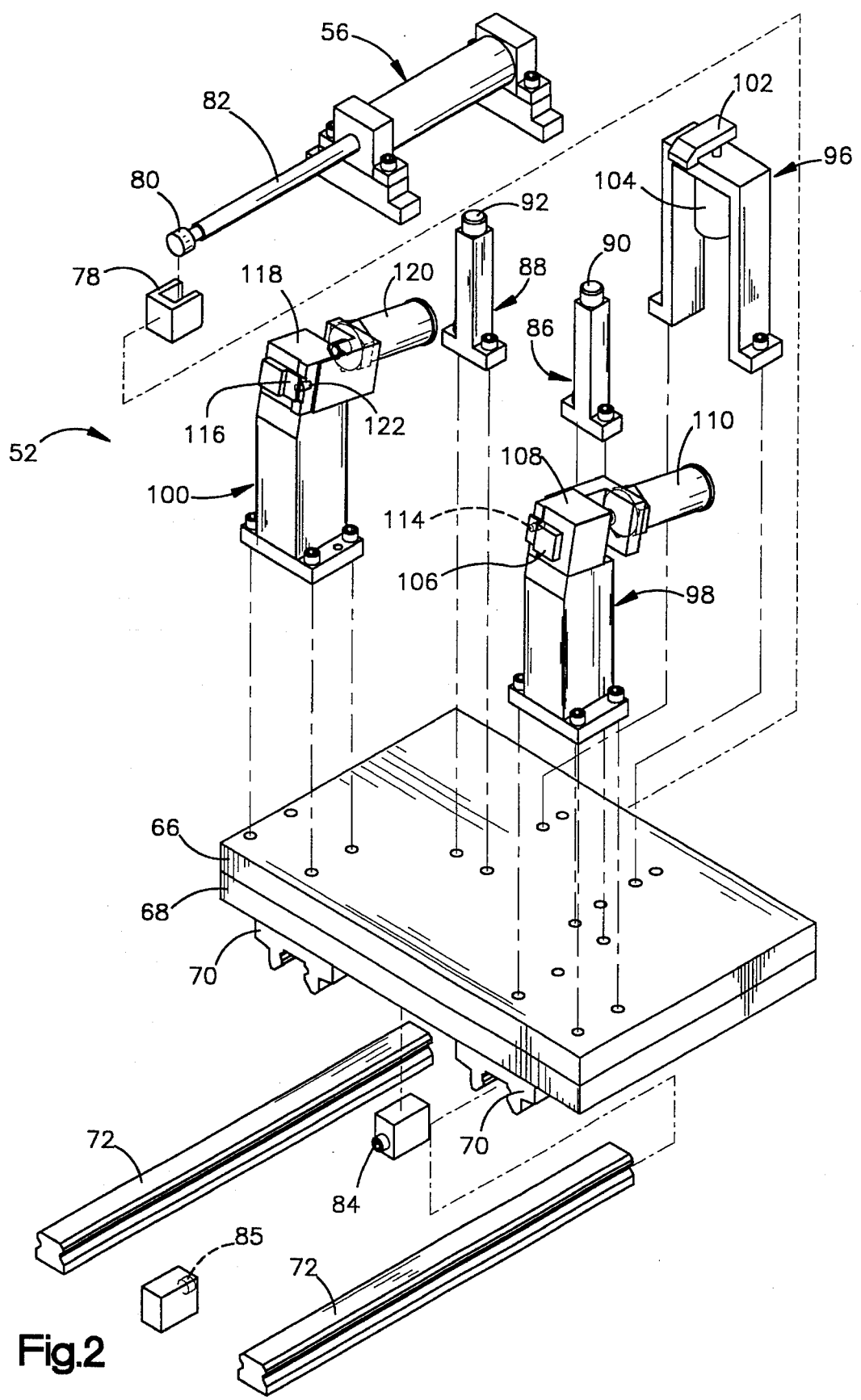
FIG. 2 is an exploded perspective view of parts of the apparatus of FIG. 1.
Figure 3:
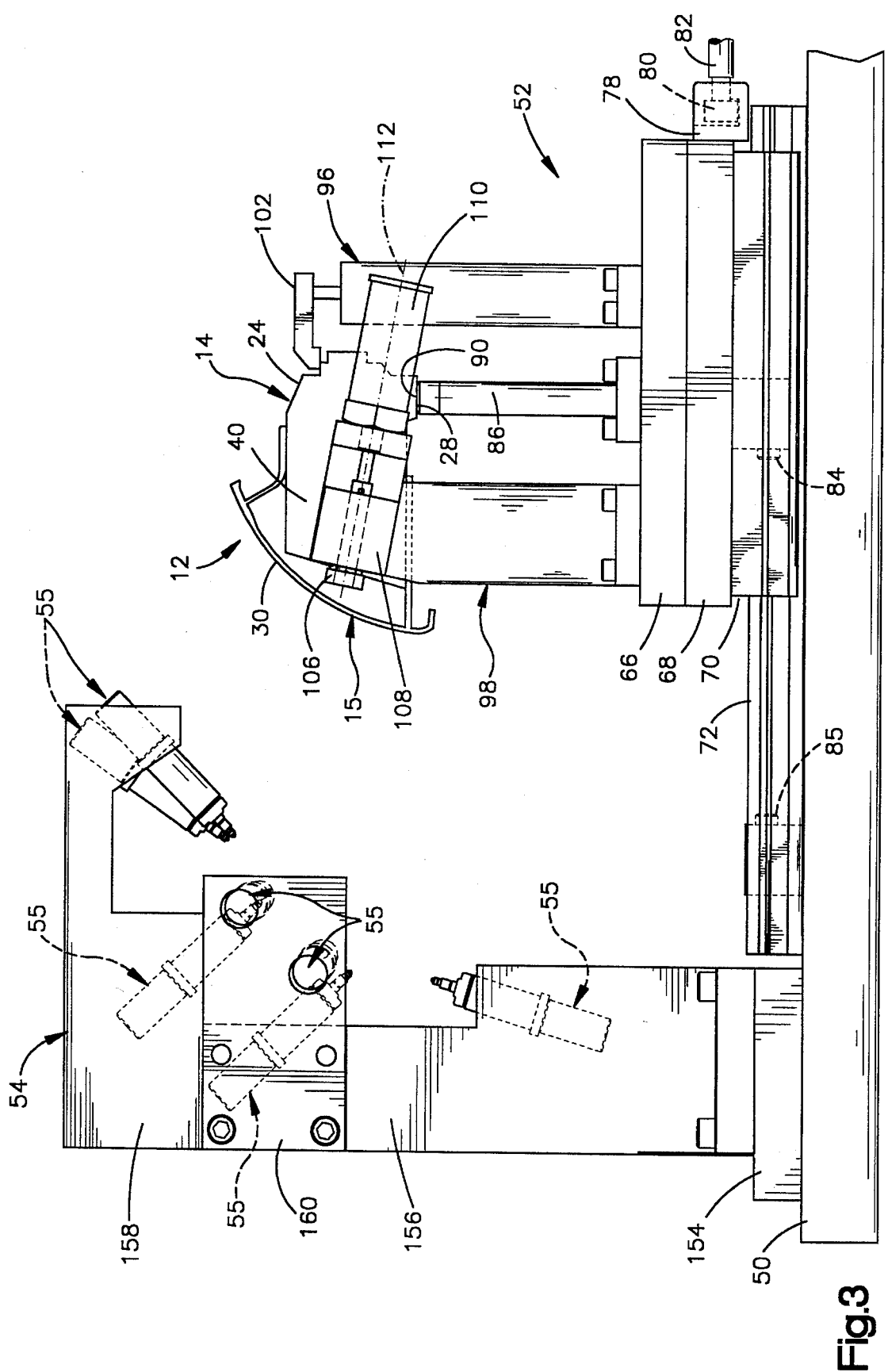
FIG. 3 is a front view of parts of the apparatus of FIG. 1.
Figure 4:
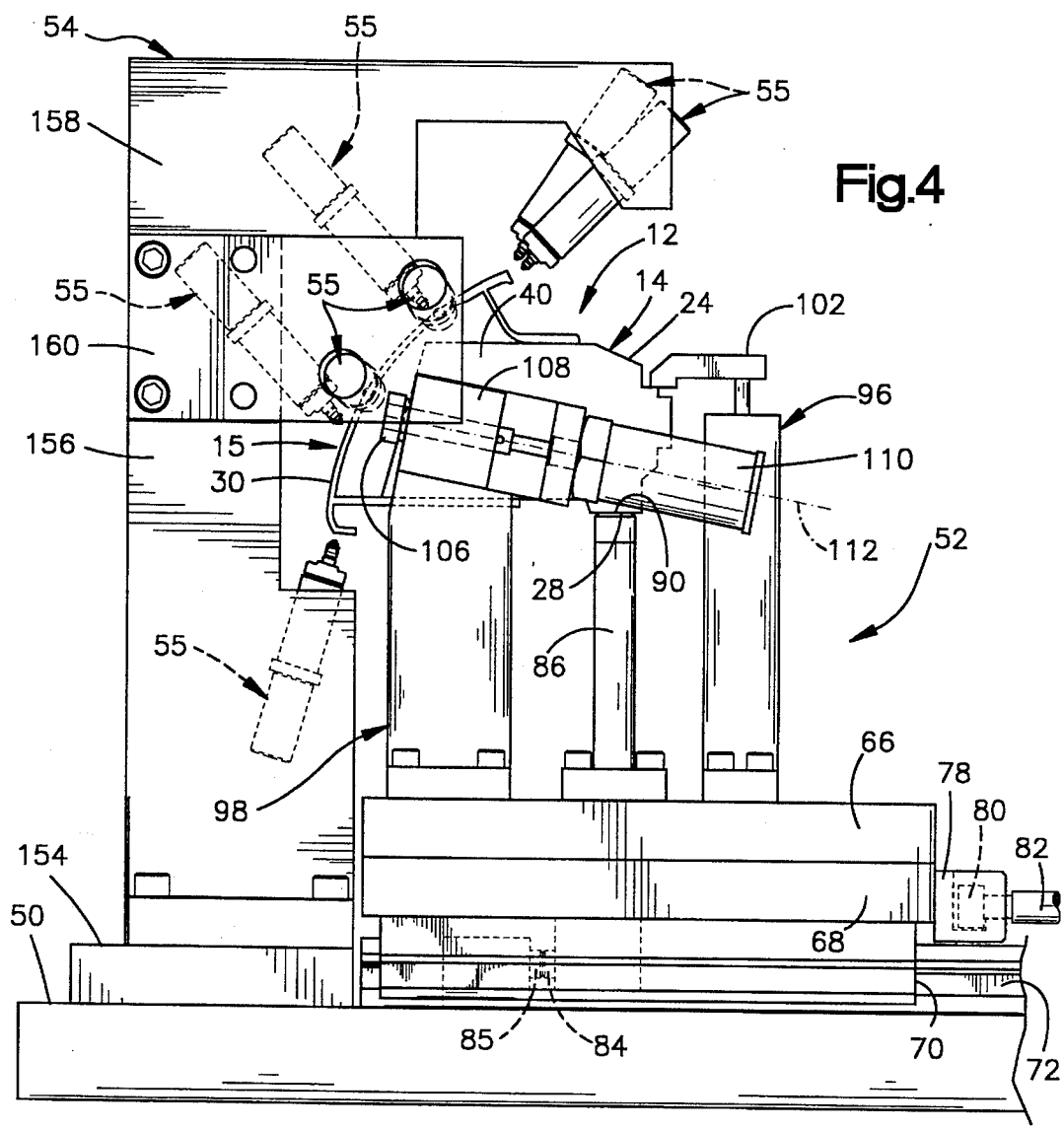
FIG. 4 is a view showing the parts of FIG. 3 in different positions.

As shown in detail in FIGS. 2–4, the base structure 52 includes a base plate 66 which is fixed to the top side of a subplate 68. A pair of carriage members 70 are fixed to the bottom side of the subplate 68. The carriage members 70 support the base structure 52 for sliding movement along a pair of rails 72 which are fixed to the table 50.

The base structure 52 is shown at the delivery station in FIG. 3, and is shown at the inspection station in FIG. 4. A coupling member 78 is fixed to the subplate 68. The coupling member 78 receives a knob 80 on the end of a piston shaft 82 which is movable longitudinally by the pneumatic motor 56. The base structure 52 is thus engaged with the pneumatic motor 56 so as to be moved back and forth along the rails 72 between the delivery station and the inspection station. A stop member 84 on the subplate 68 moves into abutment with a stop member 85 on the table 50 to limit movement of the base structure 52 toward the sensor support structure 54 when the base structure 52 reaches the inspection station. Movement of the base structure 52 in the opposite direction is limited by the pneumatic motor 56 when the base structure 52 reaches the delivery station.

The parts of the base structure 52 that engage the air bag module 12 are mounted on the base plate 66, and include a pair of posts 86 and 88 for supporting the module 12 from beneath. The first post 86 has a circular, horizontal upper surface 90 for supporting the bottom surface 28 of the reaction canister 14 at a location adjacent to one end of the reaction canister 14. The second post 88 has a circular, horizontal upper surface 92 for supporting the bottom surface 28 of the reaction canister 14 at a location adjacent to the other end of the reaction canister 14.

The parts of the base structure 52 that engage the module 12 further include three clamping assemblies 96, 98 and 100. The first clamping assembly 96 has a clamping arm 102 which is movable vertically by a pneumatic motor 104. The clamping arm 102 is thus movable into and out of a position in which it engages a stepped portion of the top surface 24 of the reaction canister 14 to clamp the reaction canister 14 against the posts 86 and 88, as shown in FIGS. 3 and 4.

The second clamping assembly 98 includes a clamping arm 106 and a clamping block 108. A pneumatic motor 110 moves the clamping arm 106 relative to the clamping block 108 along an axis 112 (FIG. 6) when the pneumatic motor 110 is actuated. The second clamping assembly 98 further includes a guide pin 114. The guide pin 114 has a circular cross sectional shape with a slightly tapered, cylindrical peripheral surface 115. The guide pin 114 is receivable through the circular opening defined by the inner edge surface 44 of the first mounting tab 42 on the reaction canister 14. The guide pin 114 is thus movable through the circular opening until the peripheral surface 115 of the guide pin 114 is closely received against the inner edge surface 44 of the first mounting tab 42, as shown in FIGS. 5 and 6. When the guide pin 114 is thus engaged with the first mounting tab 42, the module 12 can be moved pivotally about the guide pin 114 as needed when the module 12 is being placed on the base structure 52. The clamping arm 106 can then clamp the first mounting tab 42 releasably against the clamping block 108 when the clamping arm 106 is moved along the axis 112 toward the clamping block 108 by the pneumatic motor 110.

The third clamping assembly 100 also includes a clamping arm 116, a clamping block 118, and a pneumatic motor 120, each of which is substantially the same as the corresponding part of the second clamping assembly 98. The third clamping assembly 100 differs from the second clamping assembly 98 in that the third clamping assembly 100 is oriented oppositely on the base plate 66 so as to engage the module 12 at the second mounting tab 45 at the opposite end of the reaction canister 14. The third clamping assembly 100 further differs by including a guide pin 122 with a peripheral surface 124 defining an octagonal, rather than a circular, cross sectional shape. The guide pin 122 is receivable through the slot-shaped opening defined by the inner edge surface 46 of the second mounting tab 45, as shown in FIG. 7. When the guide pin 122 is thus engaged with the second mounting tab 45, a pair of flat portions of the peripheral surface 124 of the guide pin 122 abut the inner edge surface 46 of the second mounting tab 45. The peripheral surface 124 and the inner edge surface 46 then block the module 12 from moving pivotally about the guide pin 122, but permit the module 12 to move laterally relative to the guide pin 122 as needed when the module 12 is being placed on the base structure 52.

As described above with reference to FIGS. 11 and 12, the bottom surface 28 of the reaction canister 14 and the inner edge surfaces 44 and 46 of the mounting tabs 42 and 45 are primary, secondary, and tertiary datum surfaces, respectively. Each of the datum surfaces 28, 44 and 46 has a predetermined relationship to the nominal positions of the gauge points 49 on the deployment door 15. When the air bag module 12 is mounted on the base structure 52 by the clamping assemblies 96, 98 and 100 as shown in FIGS. 3 and 4, the horizontal upper surfaces 90 and 92 of the posts 86 and 88 support the bottom surface 28 of the reaction canister 14. The horizontal upper surfaces 90 and 92 thus function as primary datum support surfaces which have the same relationship to the gauge points 49 as does the bottom surface 28 of the reaction canister 14. The peripheral surfaces 115 and 124 of the guide pins 114 and 122, which engage the inner edge surfaces 44 and 46 of the mounting tabs 42 and 45, similarly function as secondary and tertiary datum support surfaces, respectively. The peripheral surfaces 115 and 124 of the guide pins 114 and 122 thus have the same relationships to the gauge points 49 as do the inner edge surfaces 44 and 46 of the mounting tabs 42 and 45. Therefore, when the module 12 is supported at the inspection station by the base structure 52, the datum support surfaces 90, 92, 115 and 124 on the base structure 52 define the nominal positions of the gauge points 49 at the inspection station.

Figure 8:
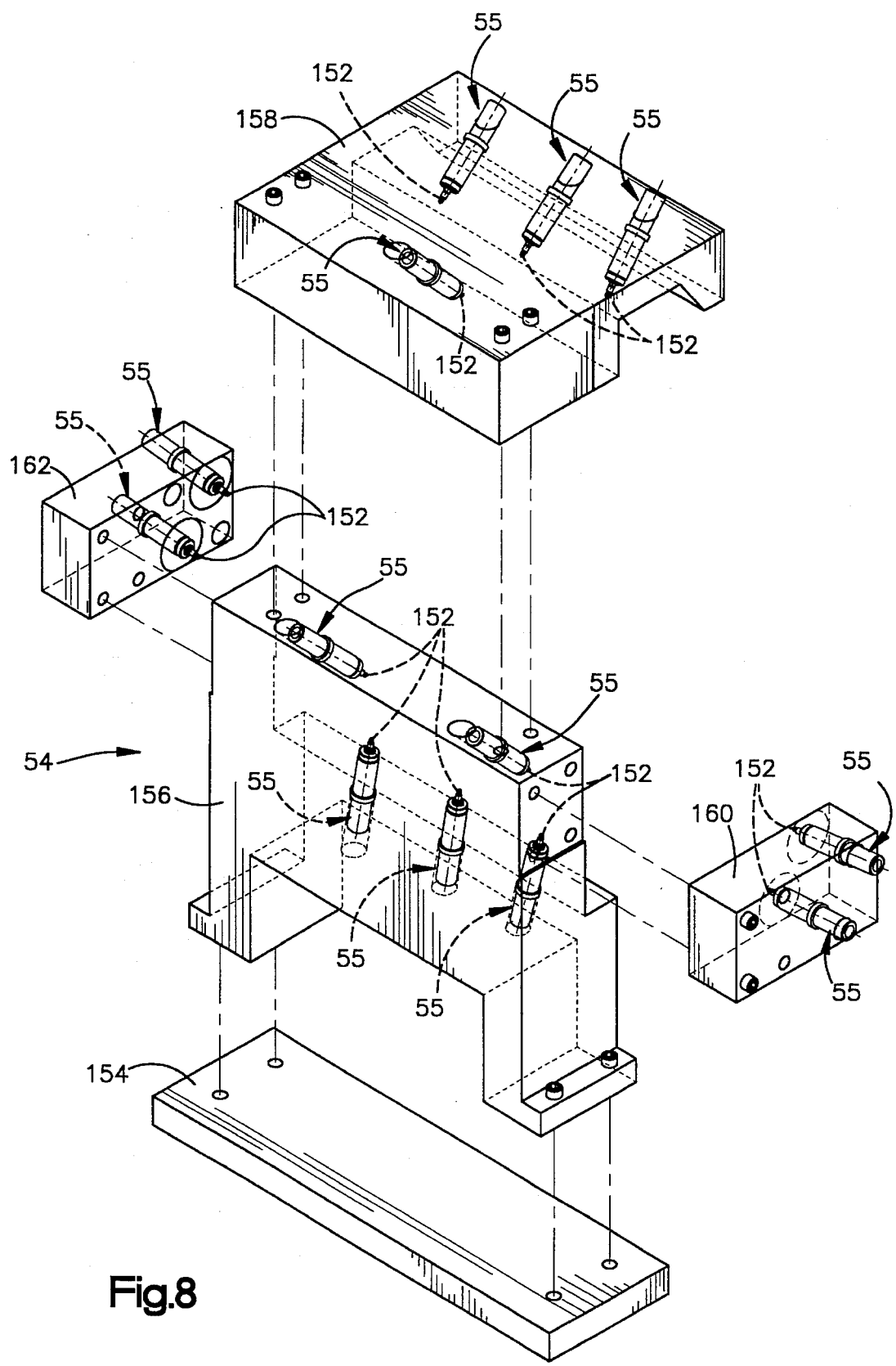
FIG. 8 is an exploded perspective view of parts of the apparatus of FIG. 1.

The sensor support structure 54 and the sensors 55 are shown in detail in FIGS. 8 and 9. In the preferred embodiment of the invention shown in the drawings, each of the sensors 55 is a probe comprising a linear variable differential transducer (LVDT). Each sensor 55 thus has a cylindrical casing 150 (FIG. 9) and a longitudinally movable armature 152 extending from the casing 150. When the sensor 55 is actuated, pneumatic pressure is directed into the casing 150 to move the armature 152 outward of the casing 150 against the bias of a spring (not shown). Such a sensor is known in the art, and, when actuated, provides an output signal indicating the extended position of the armature 152. For example, such a sensor is available from Schlumberger Industries, Transducer Division, with the model number PAG/5.0.

The sensor support structure 54 includes a base plate 154 and four support blocks 156–162. The base plate 154 is fixed to the table 50. The first support block 156 is fixed to the base plate 154. The second, third and fourth support blocks 158, 160 and 162 are fixed to the first support block 156. Each of the support blocks 156–162 has two or more separate cylindrical inner surfaces 170 (FIG. 9). Each inner surface 170 defines a bore 172 extending through the respective support block 156–162. A respective sensor 55 is received in each bore 172, with the armature 152 of the sensor 55 extending outward from the bore 172. The sensors 55 are thus supported by the sensor support structure 54 in a three dimensional array in which each of the armatures 152 is directed longitudinally toward the inspection station. Moreover, when the air bag module 12 is supported at the inspection station by the base structure 52, each of the armatures 152 is closely spaced from a respective one of the gauge points 49 on the deployment door 15.

Figure 10:
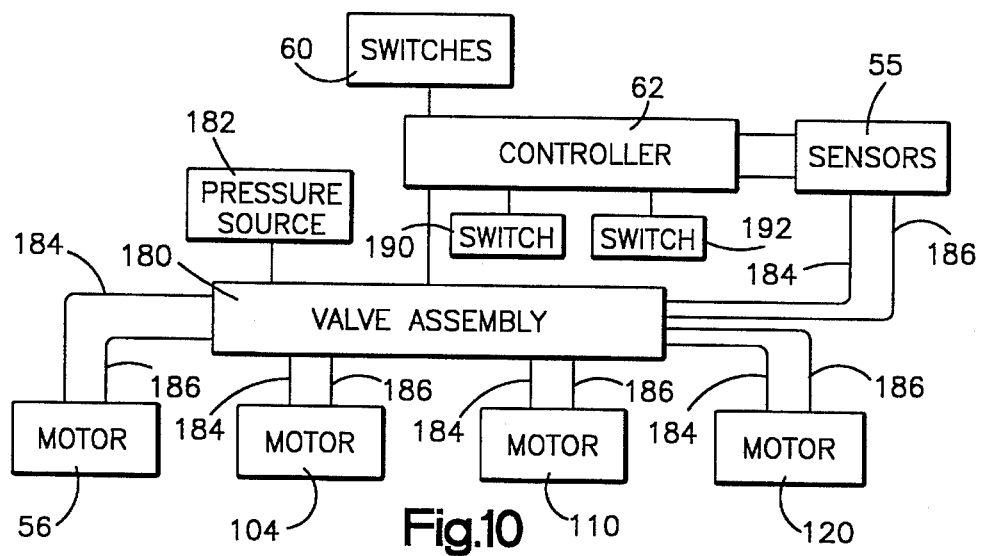
FIG. 10 is a schematic view of parts of the apparatus of FIG. 1.

As shown schematically in FIG. 10, a valve assembly 180 and a source 182 of pneumatic pressure are associated with the parts of the inspecting apparatus 10 described above. The source 182 of pneumatic pressure preferably provides standard shop air pressure. The valve assembly 180 operates to direct pneumatic pressure from the source 182 to the pneumatic motors 56, 104, 110 and 120 through a plurality of pneumatic supply lines 184. The valve assembly 180 also vents pneumatic pressure from the pneumatic motors 56, 104, 110 and 120 through a plurality of pneumatic vent lines 186. The valve assembly 180 thus operates the pneumatic motors 56, 104, 110 and 120 as directed by the controller 62. Such pneumatic devices are constructed as known in the art.

Also shown schematically in FIG. 10 is the array of sensors 55 and the operating switches 60. The valve assembly 180 directs pneumatic pressure to and from the sensors 55 as directed by the controller 62. The electrical connections which operatively connect the electrical parts of the inspecting apparatus 10 with a source of electric power, and with each other, also are constructed as known in the art.

Operation of the Inspecting Apparatus

When the air bag module 12 is to be inspected, it is manually placed on the base structure 52 at the delivery station by an operator of the inspecting apparatus 10. The module 12 is placed on the base structure 52 with the bottom surface 28 of the reaction canister 14 resting on the upper surfaces 90 and 92 of the posts 86 and 88, and with the guide pins 114 and 122 received through the openings in the mounting tabs 42 and 45. The operator of the inspecting apparatus 10 then closes both of the switches 60 manually, and thus initiates an inspecting operation which is carried out by the inspecting apparatus 10 under the direction of the controller 62.

The controller 62 responds to the closure of the switches 60 by actuating the pneumatic motors 104, 110 and 120 in the clamping assemblies 96, 98 and 100. The clamping arms 102, 106 and 116 are then moved into their clamping positions to secure the module 12 on the base assembly 52. The controller 62 subsequently actuates the pneumatic motor 56 to move the base assembly 52 and the module 12 from the delivery station (FIG. 3) to the inspection station (FIG. 4).

When the base assembly 52 arrives at the inspection station, the controller 62 responds by actuating the sensors 55. The controller 62 preferably actuates all of the sensors 55 simultaneously. The inspecting apparatus 10 may include a switch 190, as shown schematically in FIG. 10, which closes in response to the arrival of the base structure 52 at the inspection station, and which then provides an output signal to the controller 62 indicating the presence of the base structure 52 at the inspection station. The controller 62 could then actuate the sensors 55 in response to the output signal from the switch 190. Such a switch would be constructed as known in the art. The controller 62 could alternatively actuate the sensors 55 at a predetermined time after the switches 60 are closed. In either case, the controller 62 actuates the sensors 55 when the air bag module 12 is supported at the inspection station by the base structure 52.

The armatures 152 in the sensors 55 are moved outwardly of the casings 150 when the sensors 55 are actuated by the controller 62. Each of the armatures 152 is thus moved into contact with the deployment door 15 at a respective one of the gauge points 49. The sensors 55 are calibrated with reference to the nominal positions defined by the datum support surfaces 90, 92, 115 and 124 on the base structure 52. Therefore, when an armature 152 moves into contact with the deployment door 15 at the inspection station, the output signal provided by the sensor 55 indicates the displacement of the respective gauge point 49 from its nominal position. As measured along the longitudinal path of movement of an armature 152, the displacement of a gauge point 49 from its nominal position will have a value within a range that includes the value of zero at the nominal position of the gauge point 49.

The controller 62 responds to the output signals from the sensors 55 by determining a characteristic of the module 12 as a function of the displacements indicated by the output signals. As described above, the characteristic that is determined by the controller 62 is the degree to which the module 12 will fit with the particular instrument panel for which it is designed. The fit of the module 12 is then indicated by the controller 62 in terms of a result signal which is provided on the display screen 64.

The result signal provided on the display screen 64 can have any form suitable for indicating the fit of the module 12 to the operator of the inspecting apparatus 10. For example, if all of the displacements of the gauge points 49 are within a predetermined range of acceptable displacement values, the result signal can comprise an accept signal indicating an acceptable fit of the module 12. The result signal can likewise comprise a reject signal indicating an unacceptable fit of the module 12 if the displacements are not all within the predetermined range of acceptable displacement values. As a more detailed alternative, the result signal could identify the displacements, if any, that are not within the predetermined range of acceptable displacement values. The result signal could similarly indicate all of the displacements, including those with a zero value. A printer could be included in the apparatus 10 for providing a printout of any of the foregoing results of the inspecting operation.

The armatures 152 in the sensors 55 are retracted into the casings 150 after the output signals from the sensors 55 are received by the controller 62. The pneumatic motor 56 then moves the base structure 52 back from the inspection station to the delivery station. The pneumatic motor 56 moves the base structure 52 back to the delivery station in response to a signal provided by the controller 62 automatically, or in response to a signal provided by the controller 62 as a result of another manual actuation of the switches 60 by the operator of the inspecting apparatus 10.

When the base structure 52 arrives at the delivery station, another switch 192 (FIG. 10) like the switch 190 can provide a signal to the controller 62 indicating the presence of the base structure 52 at the delivery station. The controller 62 can alternatively determine that the base structure 52 has returned to the delivery station at a predetermined time. The controller 62 then directs the clamping assemblies 96, 98, and 100 to release the module 12 for manual removal from the base structure 52. Another inspecting operation can then be performed with another air bag module like the module 12.

From the above description of the invention, those skilled in the art will perceive improvements, changes and modifications. For example, the number and locations of the gauge points on the deployment door can be varied in accordance with the design of the particular air bag module to be inspected. The number and the positions of the sensors can be varied accordingly. Different sensors, such as vision cameras or laser sensors, can be used to measure the displacements of gauge points that are located on especially pliable surfaces. Moreover, additional gauge points can be located on the reaction canister in accordance with the manner in which the reaction canister must fit with the particular instrument panel for which the air bag module is designed. Machine screws are preferred for connecting the parts of the inspecting apparatus that are fixed to each other as described above, but welds or other fastening structures can be used. Electric motors can likewise be substituted for the pneumatic motors in the preferred embodiment of the invention. Such improvements, changes and modifications within the skill of the art are intended to be covered by the appended claims.

Having described the invention, the following is claimed:

1. A combination comprising:

an air bag module including a deployment door and a reaction canister, said deployment door having means for defining a plurality of gauge points, said reaction canister having means for defining a plurality of datum surfaces with a predetermined relationship to said gauge points;

movable base means for carrying said air bag module to and from an inspection station, said base means including datum support surfaces for defining a respective nominal position at said inspection station for each of said gauge points on said deployment door, said base means further including motorized clamping means for clamping said datum surfaces on said reaction canister against said datum support surfaces on said base means and for thereby supporting said air bag module on said base means;

motor means for moving said base means to and from said inspection station; and sensor means for sensing displacements of said gauge points on said deployment door from said nominal positions defined by said datum support surfaces on said base means, said sensor means being actuatable to sense said displacements when said air bag module is supported on said base means at said inspection station; and controller means for actuating said clamping means, said motor means and said sensor means, said controller means determining a characteristic of said deployment door as a function of said displacements and providing an electrical signal indicating said characteristic.

2. A combination as defined in claim 1 wherein said reaction canister has first and second mounting means for mounting said air bag module in a vehicle, said datum surfaces on said reaction canister including a datum surface on said first mounting means and a datum surface on said second mounting means.

3. A combination as defined in claim 2 wherein said datum surfaces on said first and second mounting means comprise inner edge surfaces which define respective first and second fastener openings for receiving fasteners, said base means including first and second guide members which are respectively receivable in said first and second fastener openings, said datum support surfaces on said base means including peripheral surfaces of said first and second guide members.

4. A combination as defined in claim 3 wherein said reaction canister has a generally rectangular shape with first and second opposite end walls, said first and second mounting means respectively projecting from said first and second opposite end walls.

5. A combination as defined in claim 1 wherein said reaction canister has a generally rectangular shape with an upper surface and a lower surface extending longitudinally between a pair of opposite end walls, said base means including a vertical post with an upper end surface on which said lower surface of said reaction canister rests when said air bag module is supported on said base means at said inspection station, said datum surfaces or said reaction canister including said lower surface of said reaction canister, said datum support surfaces including said upper end surface of said vertical post.

6. A combination as defined in claim 5 wherein said clamping means includes a movable clamping arm for engaging said upper surface of said reaction canister so as to clamp said reaction canister between said clamping arm and said vertical post.

7. A combination as defined in claim 6 wherein said datum support surfaces include upper end surfaces of a plurality of vertical posts.

8. A combination as defined in claim 1 wherein said sensor means includes a plurality of sensors, each of said sensors being actuatable to sense displacement of a respective one of said gauge points from a respective one of said nominal positions when said air bag module is supported on said base means at said inspection station.

9. A combination as defined in claim 8 wherein said sensors comprise linear variable differential transformers.

10. A combination as defined in claim 1 wherein said electrical signal indicates the degree to which said air bag module will fit with a vehicle instrument panel.

11. A method of inspecting an air bag module including a deployment door and a reaction canister, said method comprising the steps of:

defining a plurality of gauge points on said deployment door, and defining a plurality of datum surfaces on said reaction canister, said datum surfaces having a predetermined relationship to said gauge points;

placing said air bag module on a movable base means for carrying said air bag module to and from an inspection station, said base means including datum support surfaces for defining a respective nominal position at said inspection station for each of said gauge points on said deployment door;

said step of placing said air bag module on said base means including actuating a motorized clamping means which, when actuated, clamps said datum surfaces on said reaction canister against said datum support surfaces on said base means to support said air bag module on said base means;

actuating a motor means which, when actuated, moves said base means to said inspection station;

actuating a sensor means when said air bag module is supported on said base means at said inspection station, said sensor means, when actuated, sensing displacements of said gauge points on said deployment door from said nominal positions defined by said datum support surfaces on said base means; and actuating a controller means which, when actuated, determines a characteristic of said deployment door as a function of said displacements and provides an electrical signal indicating said characteristic.

12. A method as defined in claim 11 wherein said reaction canister has first and second mounting means for mounting said air bag module in a vehicle, said datum surfaces including a datum surface on said first mounting means and a datum surface on said second mounting means, said step of actuating said clamping means causing said clamping means to clamp said datum surfaces on said mounting means against corresponding datum support surfaces on said base means.

13. A method as defined in claim 12 wherein said datum surfaces on said first and second mounting means comprise inner edge surfaces which define respective first and second fastener openings for receiving fasteners, said base means including first and second guide members which are respectively receivable in said first and second fastener openings, said datum support surfaces on said base means including peripheral surfaces of said first and second guide members, said step of placing said air bag module on said base means including moving said guide members into said fastener openings and thereby moving said peripheral surfaces into contact with said inner edge surfaces.

14. A method as defined in claim 11 wherein said reaction canister has a generally rectangular shape with an upper surface and a lower surface extending longitudinally between a pair of opposite end walls, said datum surfaces including said lower surface of said reaction canister, said datum support surfaces on said base means including an upper end surface of a vertical post, said step of actuating said clamping means causing said clamping means to clamp said lower surface of reaction canister against said upper end surface of said vertical post.

15. A method as defined in claim 11 wherein said sensor means includes a plurality of sensors, each of said sensors being actuatable to sense displacement of a respective one of said gauge points from a respective one of said nominal positions when said air bag module is supported on said base means at said inspection station, said step of actuating said sensor means actuating all of said sensors simultaneously.

16. A method as defined in claim 11 wherein said step of actuating said controller means provides an electrical signal indicating the degree to which said air bag module will fit with a vehicle instrument panel.

* * * * *